(12) United States Patent
Ramsey

(10) Patent No.: US 8,510,910 B1
(45) Date of Patent: Aug. 20, 2013

(54) AIR BLOWER DEVICE FOR CLEANING A RAIN GUTTER AND OTHER ELEVATED SURFACES

(76) Inventor: Mark Ramsey, Omaha, NE (US)

( * ) Notice: Subject to any disclaimer, the term of this patent is extended or adjusted under 35 U.S.C. 154(b) by 0 days.

(21) Appl. No.: 13/556,397

(22) Filed: Jul. 24, 2012

(51) Int. Cl.
*A47L 5/00* (2006.01)

(52) U.S. Cl.
USPC ............................ 15/405; 15/344; 15/410

(58) Field of Classification Search
USPC .................................. 15/344, 405, 410
IPC ................................................ A47L 5/00
See application file for complete search history.

(56) References Cited

U.S. PATENT DOCUMENTS

| 4,402,106 | A | 9/1983 | Mattson |
| 5,535,479 | A | 7/1996 | Pink et al. |
| 7,926,141 | B2 * | 4/2011 | Dayton et al. ............... 15/23 |
| 8,024,995 | B2 | 9/2011 | Dayton et al. |
| 2001/0042284 | A1 | 11/2001 | Gutry |
| 2004/0143931 | A1 | 7/2004 | Dennis |

* cited by examiner

*Primary Examiner* — David Redding
(74) *Attorney, Agent, or Firm* — Dennis L. Thomte; Thomte Patent Law Office LLC

(57) ABSTRACT

A portable air blower is selectively removably secured to the upper end of a length adjustable extension pole to blow twigs, leaves or other debris from a rain gutter or other elevated structures or surfaces.

2 Claims, 4 Drawing Sheets

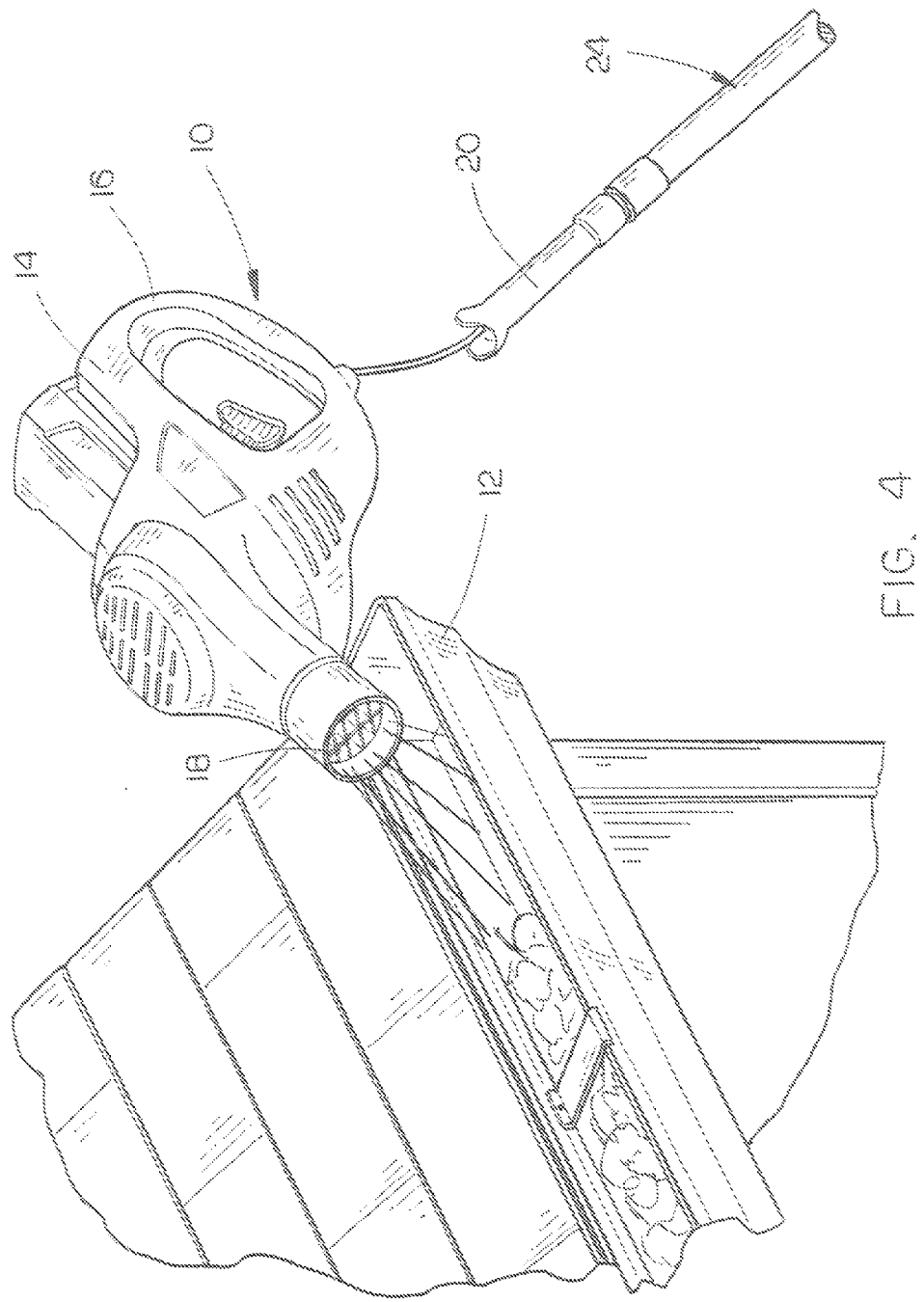

AIR BLOWER DEVICE FOR CLEANING A RAIN GUTTER AND OTHER ELEVATED SURFACES

BACKGROUND OF THE INVENTION

1. Field of the Invention

This invention relates to a portable air blower device for cleaning a rain gutter and other elevated surfaces and more particularly an air blower device when is attached to the upper end of a length adjustable extension pole.

2. Description of the Related Art

Many types of air blower devices and mechanical devices have been previously provided for cleaning leaves, twigs and other debris from rain gutters. For example, U.S. Pat. No. 4,402,106 discloses a hand-held air blower which has tubular extension members secured thereto. The major drawback of the device of U.S. Pat. No. 4,402,106 is the requirement that a plurality of extension tubes must be used with those tubes having no other useful purpose. The device of U.S. Pat. No. 4,402,106 also requires the use of an elbow at the upper end of the uppermost extension tube.

The device of Published Patent Application US 2004/0143931 requires the use of a straight extension and a gooseneck extension. There is also the possibility that the velocity of the air passing through the extensions of the three devices described above will be reduced since the air must be blown some distance from the air blower.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A rain gutter cleaning apparatus is disclosed which includes an elongated extension pole having a lower handle and an upper end. An air blower is secured to the upper end of the pole. The air blower is powered by a battery directly affixed thereto so that all of the components of the air blower are positioned at the upper end of the extension pole. The air blower includes an air flow discharge tube whereby the air blower may be maneuvered by an operator grasping the handle of the extension pole so that the air flow from the air flow discharge tube may be directed into the rain gutter being cleaned to blow leaves, twigs and other debris from the rain gutter.

The apparatus of this invention may also be used to clean overhead or elevated structures.

In the preferred embodiment, the air blower is selectively removably secured to the upper end of the extension pole.

In the preferred embodiment, the upper end of the extension pole is threadably secured to the air blower.

It is therefore a principal object of the invention to provide an improved air blower device which may be used to clean twigs, leaves and other debris from a rain gutter or an overhead structure or elevated structure.

A further object of the invention is to provide a device of a type described wherein an air blower is secured to the upper end of an extension pole.

A further object of the invention is to provide a device of the type described which includes a self-contained and battery operated air blower mounted on the upper end of an extension pole for cleaning rain gutters and other elevated surfaces.

The further object of the invention is to provide a device of a type described which is easy to use and is safe to use.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 4 illustrates the manner in which the air blower may be positioned to blow debris from a rain gutter or the like.

DESCRIPTION OF THE PREFERRED EMBODIMENT

Figure 1:
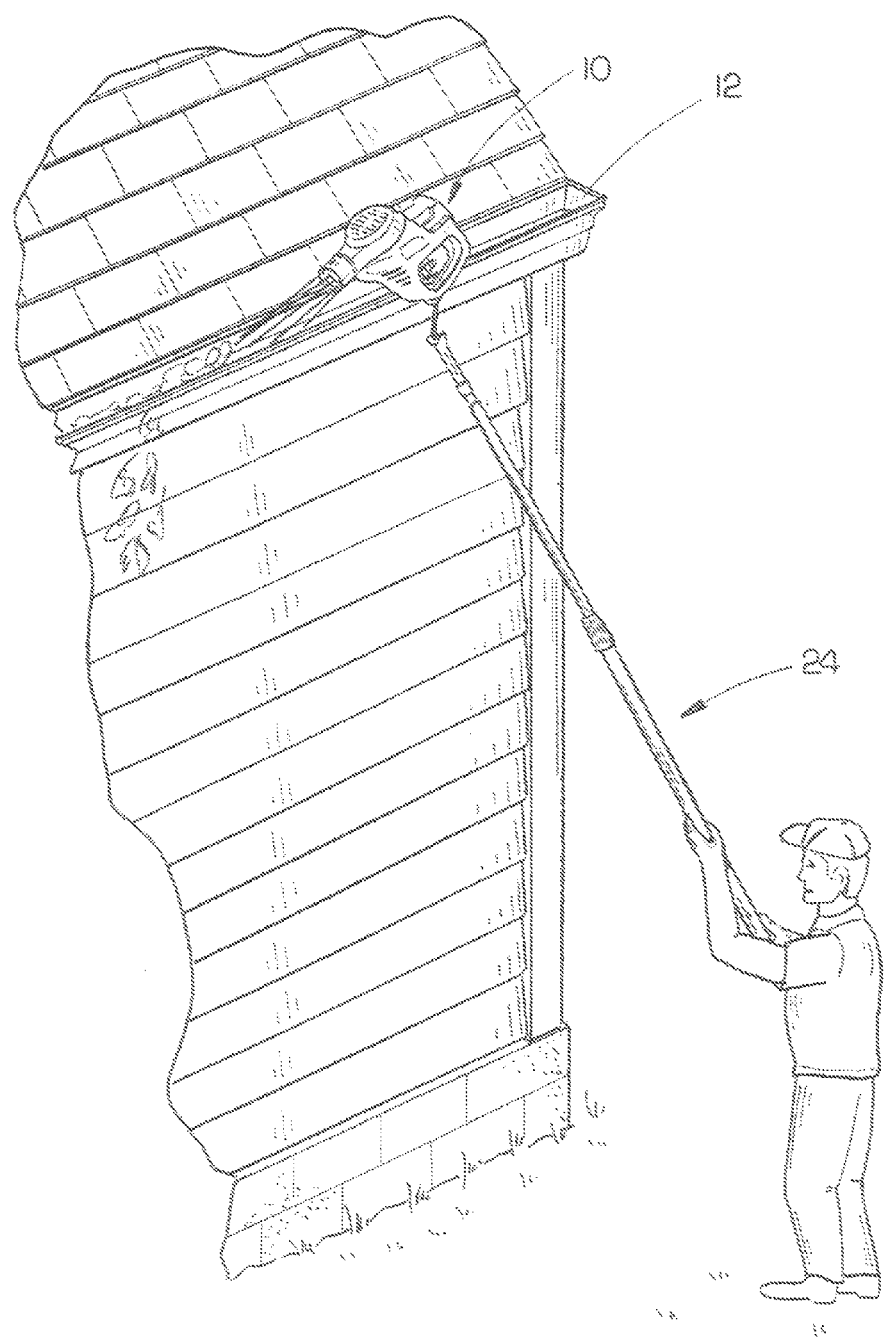
FIG. 1 is a perspective view illustrating air blower device of this invention being used to blow debris from a rain gutter.
Figure 2:
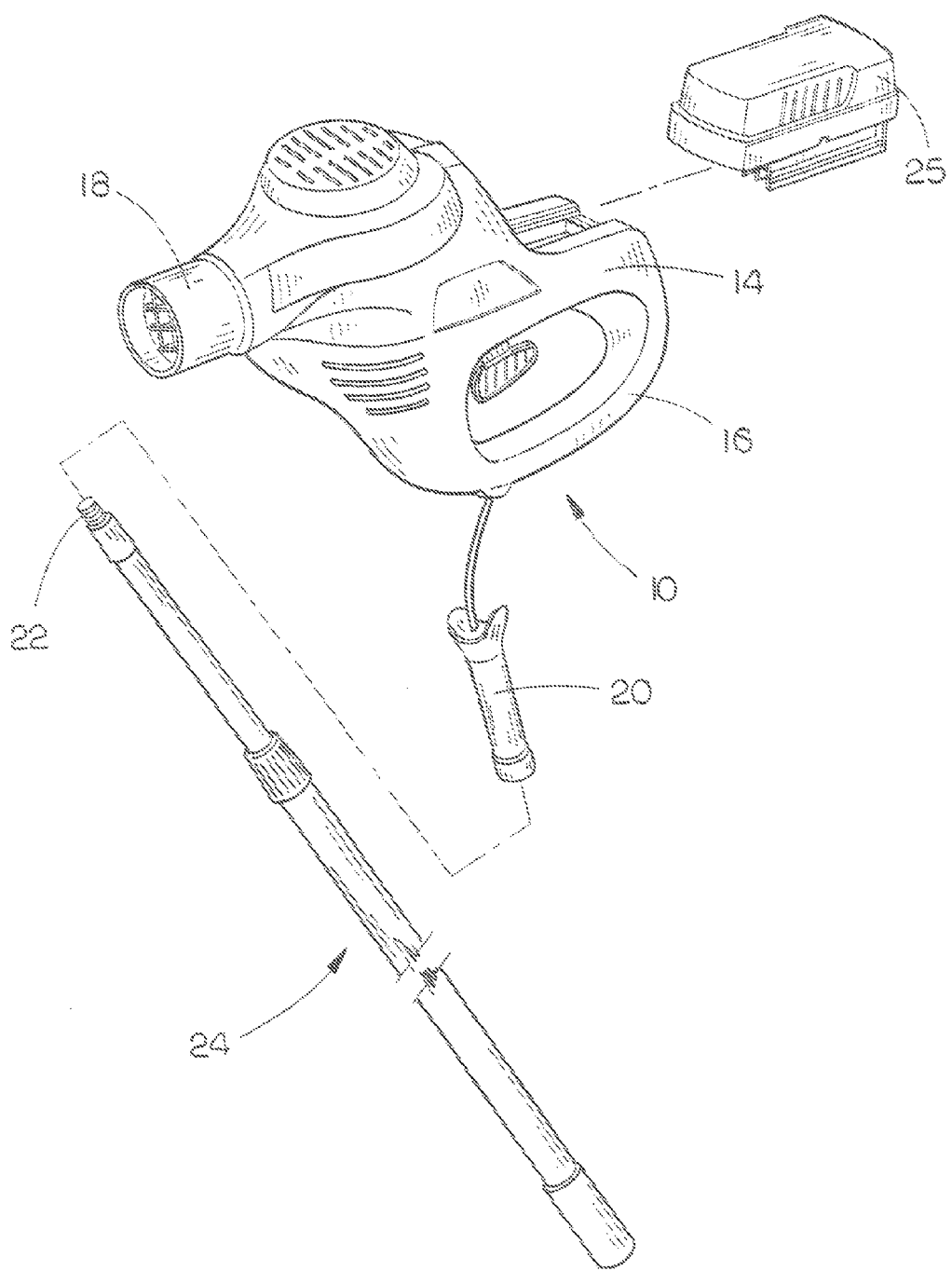
FIG. 2 is an exploded perspective view of the device of this invention.
Figure 3:
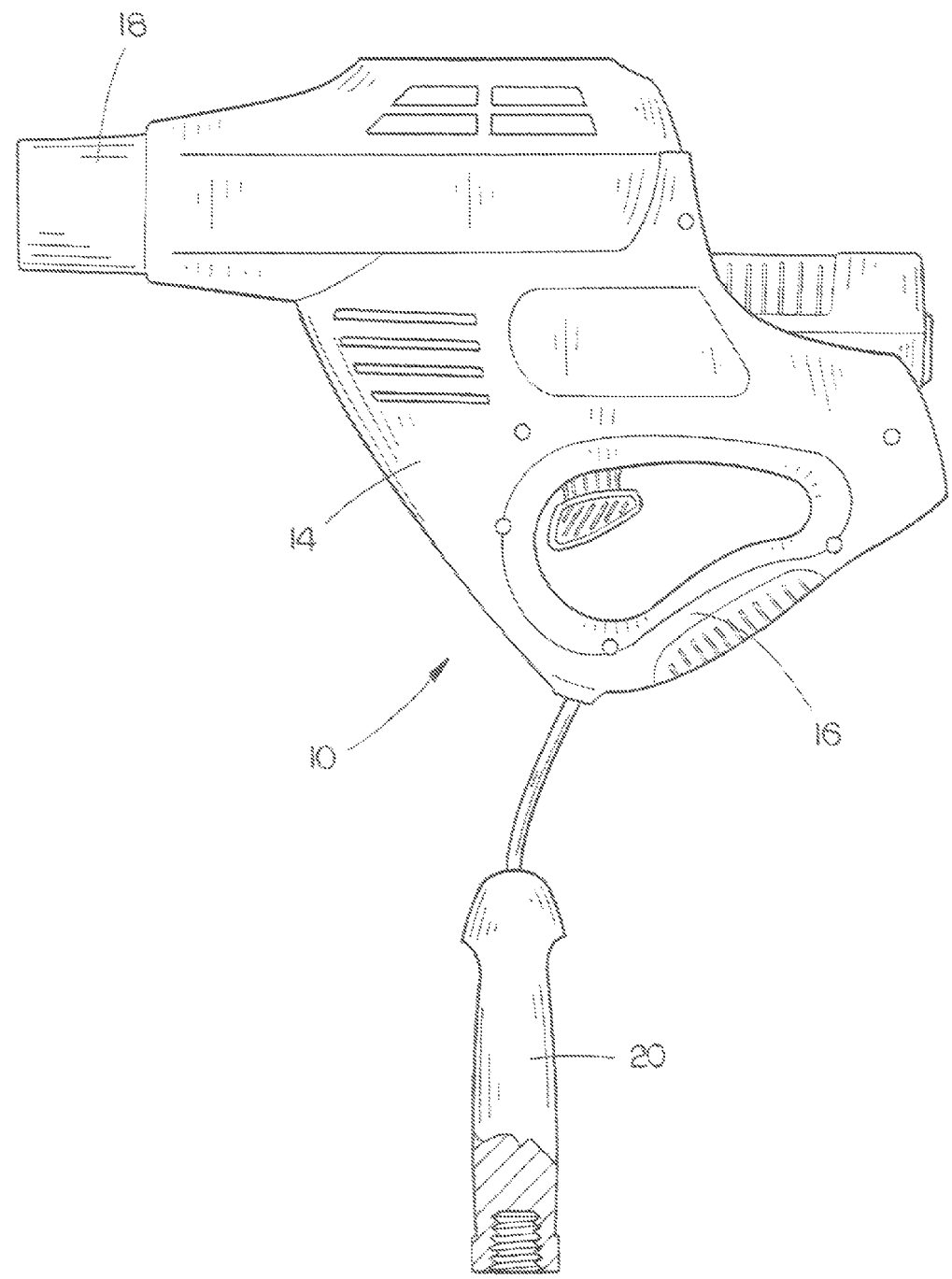
FIG. 3 is a side view of the device.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The air blower cleaning device of the invention is generally designated by the reference numeral 10 and may be used to clean leaves, twigs or other debris from a rain gutter 12 or an elevated surface or structure such as a roof, canopy, screen, etc. Device 10 is a battery operated air blower having a frame 14 with a handle 16 attached thereto. In some cases, the handle 16 may not be used but the handle 16 provides a means for carrying the device. Device 10 has an air discharge tube 18 extending therefrom. When the device 10 is activated, air is blown from the tube 18 in conventional fashion.

An internally threaded connector 20 is secured to the handle 16 or to the frame 14 of the device 10. Connector 20 is adapted to threadably receive the externally threaded connector 22 of a length adjustable extension pole 24.

In use, a charged battery 25 is affixed to the device 10 to power the same. The connector 22 of the extension pole 24 is threadably secured to connector 20. The length of the extension pole 24 is then adjusted to the desired length. The device 10 is then activated. The operator then grasps the extension pole 24 and positions the device 10 relative to the rain gutter 12 so that the air being blown from the tube 18 will be directed into the rain gutter 12 to blow the twigs, leaves or other debris therefrom as seen in FIGS. 1 and 4. The device 10 is moved along the length of the rain gutter 12 so that the debris will be blown along the rain gutter and outwardly therefrom.

The device 10 is easily moved by the operator holding the extension pole 24 so that the discharged air is directed onto the debris to blow the debris from the rain gutter. As stated, the device 10 may be used to blow debris from other elevated surfaces or structures such as a roof, canopy, screen, etc.

It can therefore be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A rain gutter cleaning apparatus, comprising:
   an elongated pole having a first lower handle end and a second upper end;
   an air blower secured to said second upper end of said pole;
   said air blower including a handle;
   said upper end of said pole being threadably secured to said handle;
   an air blower secured to said second upper end of said pole;
   said air blower being powered by a battery directly affixed thereto so that all of the components of the air blower are positioned at said second upper end of said pole;
   said air blower including an air flow discharge tube whereby said air blower may be maneuvered by an operator grasping said first lower handle end so that the air flow from said air flow discharge tube may be directed into the rain gutter being cleaned to blow debris from the rain gutter.

2. An overhead structure cleaning apparatus, comprising:
   an elongated pole having a first lower handle end and a second upper end;
   an air blower secured to said second upper end of said pole;
   said air blower including a handle;
   said upper end of said pole being threadably secured to said handle;
   said air blower being powered by a battery directly affixed thereto so that all of the components of the air blower are positioned at said second upper end of said pole;
   said air blower including an air flow discharge tube whereby said air blower may be maneuvered by an operator grasping said first lower handle end so that the air flow from said air flow discharge tube may be directed onto the overhead structure to blow debris therefrom.

* * * * *